United States Patent
Yang

(10) Patent No.: US 6,880,406 B2
(45) Date of Patent: Apr. 19, 2005

(54) SEMICONDUCTOR PRESSURE SENSOR

(75) Inventor: Chien-Sheng Yang, Taipei (TW)

(73) Assignee: AU Optronics Corp., Hsin-Chu (TW)

( * ) Notice: Subject to any disclaimer, the term of this patent is extended or adjusted under 35 U.S.C. 154(b) by 57 days.

(21) Appl. No.: 10/604,723

(22) Filed: Aug. 13, 2003

(65) Prior Publication Data
US 2004/0237661 A1 Dec. 2, 2004

(30) Foreign Application Priority Data
May 28, 2003 (TW) .......................... 92114485 A

(51) Int. Cl.$^7$ ............................................. G01L 9/16
(52) U.S. Cl. ........................................................ 73/754
(58) Field of Search .................... 73/706, 754, 756, 73/715–727; 29/25.41, 25.42; 257/347, 352, 353, 354, 66–69, 57, 72, 350

(56) References Cited

U.S. PATENT DOCUMENTS

| | | | | |
|---|---|---|---|---|
| 4,996,627 A | * | 2/1991 | Zias et al. ............... | 361/283.4 |
| 5,706,565 A | * | 1/1998 | Sparks et al. ............... | 29/25.42 |
| 6,137,120 A | * | 10/2000 | Shindo et al. ................ | 257/66 |
| 6,177,706 B1 | * | 1/2001 | Shindo et al. ............... | 257/347 |

* cited by examiner

Primary Examiner—William Oen
(74) Attorney, Agent, or Firm—Winston Hsu

(57) ABSTRACT

A semiconductor pressure sensor comprises a non-single-crystal-silicon-based substrate, a movable insulating diaphragm, at least one piezoresistor positioned on the insulating diaphragm, an insulating supporter positioned on the non-single-crystal-silicon-based substrate for fixing two ends of the insulating diaphragm and forming a cavity between the insulating diaphragm and the non-single-crystal-silicon-based substrate, and a thin film transistor (TFT) control circuit positioned on the non-single-crystal-silicon-based substrate and electrically connected to the insulating diaphragm and the piezoresistor.

24 Claims, 2 Drawing Sheets

SEMICONDUCTOR PRESSURE SENSOR

BACKGROUND OF INVENTION

1. Field of the Invention

The present invention relates to a pressure sensor, and more specifically, to a semiconductor pressure sensor capable of avoiding generating leakage currents for meeting market requirements.

2. Description of the Prior Art

Air pressure and hydraulic measurements are important in industrial control. Currently, a pressure sensor in common use includes a piezoresistive pressure sensor, a piezoelectric pressure sensor, a capacitive pressure sensor, a potentiometer pressure sensor, an inductive-bridge pressure sensor, a strain gauge pressure sensor, and a semiconductor pressure sensor.

Additionally, because sizes of various pressure sensors are reduced gradually, a micromachining technology is developed to manufacture various microsensors and microactuators that are integrated with micro electronic circuits to form a microsystem, which is generally called a micro electro-mechanical system (MEMS). The MEMS has an extremely small size and can be manufactured by utilizing batch production for reducing a production cost. In addition, the MEMS and a signal processing circuit can be simultaneously formed on a silicon wafer for forming a monolithic device, which can reduce a distance between a pressure sensor and the signal processing circuit and that is quite important for pressure sensors. As the pressure sensor outputs a signal, the signal is firstly amplified by the signal processing circuit for preventing the signal from being disturbed by an ambient electromagnetic field, and the signal can be analog-to-digital (A/D) converted by the signal processing circuit and be transmitted to a central processing unit. Therefore, as the distance between the pressure sensor and the signal processing circuit is reduced, signal reliability can be greatly improved, and interconnecting lines and loads of central control systems can be effectively decreased. As a result, the pressure sensor that is manufactured by use of MEMS is developed rapidly due to its advantages of good detection sensitivity and a low production cost. Additionally, among the above-mentioned kinds of pressure sensors, the piezoresistivepressure sensor has advantages of a high output voltage and high detection sensitivity, while the piezoelectricpressure sensor has advantages of high detection sensitivity, a low electromagnetic interruption, low power dissipation, high energy density, a fast response, and low sensitivity to an ambient environment. Accordingly, the piezoresistive pressure sensor and the piezoelectric pressure sensor are usually applied on microsensors and microactuators in the MEMS field.

Please refer to FIG. 1. FIG. 1 is a sectional view of a conventional piezoresistive semiconductor pressure sensor 10. As shown in FIG. 1, the piezoresistive semiconductor pressure sensor 10 comprises an etched semiconductor substrate 12, such as a single-crystal silicon substrate or a silicon-on-insulator (SOI) substrate. The etched semiconductor substrate 12 includes a diaphragm 14, a base 16 for fixing two ends of the diaphragm 14 and forming a cavity 18 under the diaphragm 14, and a piezoresistor 20 positioned in the diaphragm 14 and used as a sensing device of the piezoresistive semiconductor pressure sensor 10. Additionally, the piezoresistive semiconductor pressure sensor 10 further comprises a control circuit 22 positioned in the etched semiconductor substrate 12 and electrically connected to the diaphragm 14 and the piezoresistor 20. The control circuit 22 mainly includes a complementary metal-oxide semiconductor (CMOS), an amplifying circuit, or a logic circuit, and the control circuit 22 functions to receive, process, and transmit signals output from the piezoresistor 20.

For forming the etched semiconductor substrate 12, an anisotropic etching process is usually performed to etch a reverse side of a semiconductor substrate through use of an etchant, such as potassium hydroxide (KOH), so as to form the diaphragm 14 and the base 16, whose areas and thickness conform to process requirements. Additionally, a portion of the diaphragm 14 is implanted with boron (B) through use of a thermal diffusing method or an ion implantation process for forming the piezoresistor 20. Because the diaphragm 14 comprises single-crystal silicon, a p-n junction can be formed after the diaphragm 14 is implanted with boron (B), and the p-n junction forms the piezoresistor 20 that is used to measure a variation of pressure.

When a pressure to be measured is exerted on the diaphragm 14, or a pressure difference is generated between the inside and the outside of the diaphragm 14, a central portion of the diaphragm 14 will be deformed, thereby causing the piezoresistor 20 to be deformed. Therefore, a resistance of the piezoresistor 20 will be altered due to surface expansion or surface contraction of the piezoresistor 20. Thereafter, the control circuit 22 performs a signal process, such as signal amplification or temperature compensation, and the control circuit 22 converts a resistance variation of the piezoresistor 20 into a differential signal. Finally, the control circuit 22 outputs the differential signal, which corresponds to the pressure to be measured.

Alternatively, if the piezoresistor 20 is formed with a piezoelectric thin film, such as ZnO, the semiconductor pressure sensor 10 becomes a piezoelectric semiconductor pressure sensor. The piezoelectric semiconductor pressure sensor is driven according to the piezoelectric effect. As a pressure is applied on the piezoelectric thin film, electric charges are generated at two ends of the piezoelectric thin film and the amount of the electric charges are directly proportional to the pressure. Accordingly, the pressure can be obtained through measuring a variation of the electric charges.

The conventional piezoresistive semiconductor pressure sensor and the conventional piezoelectric semiconductor pressure sensor are both composed of single-crystal silicon, so that the conventional semiconductor pressure sensor 10 has good detection sensitivity. However, a cost of silicon wafer is so high that it costs a lot to form the conventional semiconductor pressure sensor 10. As a result, it is an important issue to manufacture a semiconductor pressure sensor with a low production cost and a high quality. Additionally, since the piezoresistor is formed through use of a thermal diffusing method or an ion implantation process in the prior art, the p-n junction is therefore formed between the piezoresistor and the diaphragm of single-crystal silicon. Nevertheless, leakage currents are usually generated near the p-n junction, thus disturbing an operation of the sensor.

SUMMARY OF INVENTION

It is therefore a primary objective of the claimed invention to provide a semiconductor pressure sensor with a low production cost and capable of reducing the above-mentioned leakage currents.

According to the claimed invention, a semiconductor pressure sensor is provided. The semiconductor pressure sensor comprises a non-single-crystal-silicon-based substrate, a movable insulating diaphragm, at least one piezoresistor positioned on the insulating diaphragm, an insulating supporter positioned on the non-single-crystal-silicon-based substrate for fixing two ends of the insulating diaphragm and forming a cavity between the insulating diaphragm and the non-single-crystal-silicon-based substrate, and a thin film transistor (TFT) control circuit positioned on the non-single-crystal-silicon-based substrate and electrically connected to the insulating diaphragm and the piezoresistor.

It is an advantage over the prior art that the semiconductor pressure sensor of the claimed invention is formed on the non-single-crystal-silicon-based substrate, such as a glass substrate or other insulating substrates, thereby effectively reducing prime costs of raw materials. Additionally, the piezoresistor is composed of polysilicon or other piezoelectric materials, so that the claimed invention can avoid generating leakage currents, and improve detection sensitivity and accuracy.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
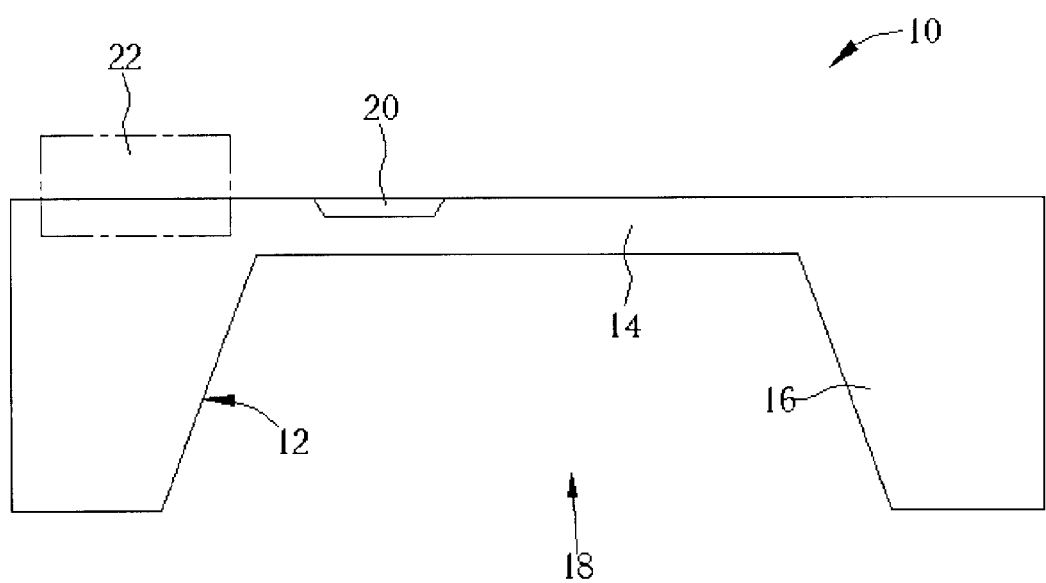
FIG. 1 is a sectional view of a conventional piezoresistive semiconductor pressure sensor.
Figure 2:
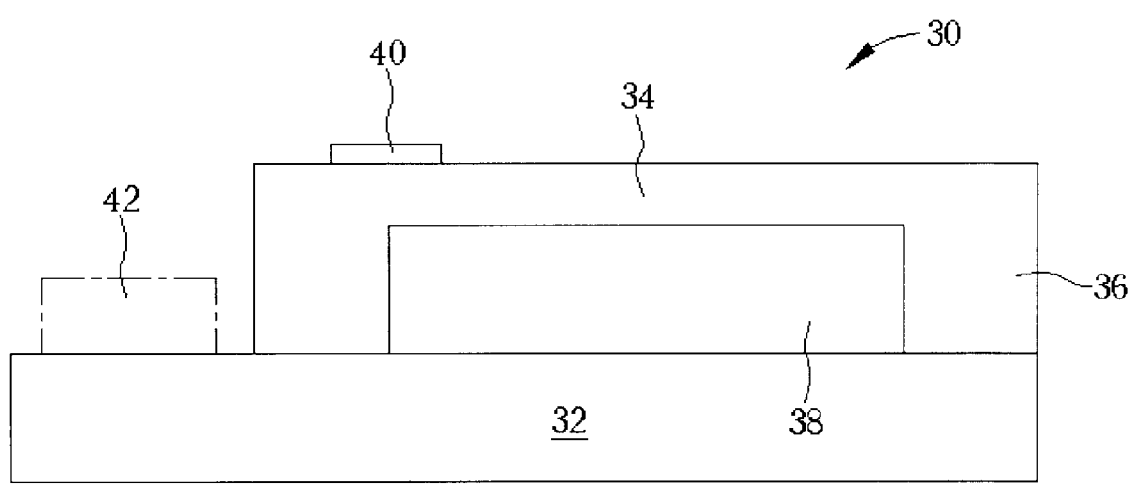
FIG. 2 is a sectional view of a piezoresistive semiconductor pressure sensor according to the present invention.

Please refer to FIG. 2. FIG. 2 is a sectional view of a piezoresistive semiconductor pressure sensor 30 according to the present invention. As shown in FIG. 2, the piezoresistive semiconductor pressure sensor 30 mainly comprises a non-single-crystal-silicon-based substrate 32, a movable insulating diaphragm 34, an insulating supporter 36 positioned on the non-single-crystal-silicon-based substrate 32 for fixing two ends of the diaphragm 34 and forming a cavity 38 between the diaphragm 34 and the non-single-crystal-silicon-based substrate 32, at least one piezoresistor 40 positioned on the diaphragm 34, and a control circuit 42, such as a thin film transistor (TFT) control circuit, positioned on the non-single-crystal-silicon-based substrate 32. The TFT control circuit 42 is electrically connected to the diaphragm 34 and the piezoresistor 40 for receiving, processing, and transmitting signals output from the piezoresistor 40. Furthermore, if the piezoresistor 42 is replaced with a piezoelectric thin film (not shown in FIG. 2), the semiconductor pressure sensor of the present invention becomes a piezoelectric semiconductor pressure sensor.

In the preferred embodiment of the present invention, the non-single-crystal-silicon-based substrate 32 is composed of glass. Because the glass substrate 32 has a low melting point, the TFT control circuit 42 has to be a low temperature polysilicon (LTPS) TFT control circuit, which can be formed at a low temperature, thereby preventing the glass substrate 32 from being damaged due to a high temperature. Additionally, the non-single-crystal-silicon-based substrate 32 can be a quartz substrate in another embodiment of the present invention. Owing to a high melting point of the quartz substrate 32, the TFT control circuit 42 can be a high temperature polysilicon TFT control circuit. In addition, the diaphragm 34 and the supporter 36 can be formed simultaneously or can be formed separately. The diaphragm 34 and the supporter 36 can be composed of insulating materials, such as silicon dioxide. The piezoresistor 40 is composed of doped polysilicon, and the piezoresistor 40 can be formed through use of e-beam evaporation or RF sputtering. The piezoelectric thin film comprises ZnO, $BaTiO_3$, or $PbZrTiO_3$ (PZT), and the piezoelectric thin film can be formed through use of e-beam evaporation, RF sputtering, a sol-gel method, or metallo-organic decomposition (MOD). Among the above-mentioned methods of forming the piezoelectric thin film, the MOD can produce a piezoelectric thin film with thicker thickness, good surface properties, and good piezoelectric characteristics.

Likewise, a pressure can be measured by the piezoresistive semiconductor pressure sensor 30 through detecting a resistance variation of the piezoresistor 40. Additionally, the piezoelectric semiconductor pressure sensor is a resonant force sensor that is driven according to the piezoelectric effect. The piezoelectric semiconductor pressure sensor utilizes the piezoelectric thin film as a transducer, which is used to detect signals and drive the supporter 36 to resonate. Furthermore, an area of the piezoelectric thin film can be modified to reduce electrical crosstalk, thereby optimizing a detection characteristic of the sensor. The operation of the semiconductor pressure sensor 30 is the same as that of the conventional semiconductor pressure sensor 10, and is thereby omitted.

It should be noticed that although the control circuit 42 is formed on the glass substrate 32 in the preferred embodiment of the present invention, the present invention is not confined to that. The control circuit 42 also can be formed on a printed circuit board (PCB) (not shown) and be electrically connected to the diaphragm 34 and the piezoresistor 40 via a flexible printed circuit (FPC) board (not shown). Alternatively, the control circuit 42, maybe including a plurality of integrated circuit (IC) chips, can be directly formed on a FPC board, and the control circuit 42 is electrically connected to the diaphragm 34 and the piezoresistor 40 via the FPC board. Furthermore, a surface of the non-single-crystal-silicon-based substrate 32 further comprises a TFT display area (not shown) for displaying a variation of pressure detected by the semiconductor pressure sensor 30, thereby making it convenient for users to measure a variation of pressure and to observe measuring results.

In comparison with the prior art, the piezoresistive semiconductor pressure sensor and the piezoelectric semiconductor pressure sensor of the present invention are formed on the glass substrate or other insulating substrates, so that prime costs of raw materials can be reduced considerably. Additionally, the piezoresistor is composed of polysilicon or other piezoelectric materials, and the piezoresistor can be formed on the diaphragm through use of evaporation, so that the piezoresistor of the present invention can have a better piezoelectric coefficient and can be bent more largely, thereby avoiding generating leakage currents and improving detection sensitivity and accuracy.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A semiconductor pressure sensor comprising:
   a non-single-crystal-silicon-based substrate;
   a movable insulating diaphragm;
   at least one piezoresistor positioned on the insulating diaphragm;

an insulating supporter positioned on the non-single-crystal-silicon-based substrate for fixing two ends of the insulating diaphragm and forming a cavity between the insulating diaphragm and the non-single-crystal-silicon-based substrate; and a thin film transistor (TFT) control circuit positioned on the non-single-crystal-silicon-based substrate and electrically connected to the insulating diaphragm and the piezoresistor.

2. The semiconductor pressure sensor of claim 1 wherein the non-single-crystal-silicon-based substrate is a glass substrate.

3. The semiconductor pressure sensor of claim 2 wherein the TFT control circuit is a low temperature polysilicon TFT control circuit.

4. The semiconductor pressure sensor of claim 1 wherein the non-single-crystal-silicon-based substrate is a quartz substrate.

5. The semiconductor pressure sensor of claim 4 wherein the TFT control circuit is a high temperature polysilicon TFT control circuit.

6. The semiconductor pressure sensor of claim 1 wherein the insulating diaphragm and the insulating supporter are formed simultaneously.

7. The semiconductor pressure sensor of claim 6 wherein the insulating diaphragm and the insulating supporter both comprise silicon dioxide.

8. The semiconductor pressure sensor of claim 1 wherein the piezoresistor comprises doped polysilicon.

9. The semiconductor pressure sensor of claim 1 wherein the piezoresistor comprises a piezoelectric thin film.

10. The semiconductor pressure sensor of claim 9 wherein the piezoelectric thin film comprises ZnO, $BaTiO_3$, or $PbZrTiO_3$ (PZT).

11. The semiconductor pressure sensor of claim 1 wherein the non-single-crystal-silicon-based substrate further comprises a thin film transistor display region for displaying a variation of pressure detected by the semiconductor pressure sensor.

12. A semiconductor pressure sensor comprising:

an insulating substrate;

a movable insulating diaphragm;

a piezoresistor positioned on the insulating diaphragm;

an insulating supporter positioned on the insulating substrate for fixing two ends of the insulating diaphragm and forming a cavity between the insulating diaphragm and the insulating substrate; and a control circuit electrically connected to the insulating diaphragm and the piezoresistor.

13. The semiconductor pressure sensor of claim 12 wherein the insulating diaphragm and the insulating supporter are formed simultaneously.

14. The semiconductor pressure sensor of claim 12 wherein the insulating diaphragm and the insulating supporter both comprise silicon dioxide.

15. The semiconductor pressure sensor of claim 12 wherein the piezoresistor comprises doped polysilicon.

16. The semiconductor pressure sensor of claim 12 wherein the piezoresistor is a piezoelectric thin film.

17. The semiconductor pressure sensor of claim 16 wherein the piezoelectric thin film comprises ZnO, $BaTiO_3$, or $PbZrTiO_3$ (PZT).

18. The semiconductor pressure sensor of claim 12 wherein the insulating substrate is a glass substrate.

19. The semiconductor pressure sensor of claim 18 wherein the control circuit is positioned on the glass substrate and the control circuit comprises a low temperature polysilicon thin film transistor control circuit.

20. The semiconductor pressure sensor of claim 12 wherein the insulating substrate is a quartz substrate.

21. The semiconductor pressure sensor of claim 20 wherein the control circuit is positioned on the quartz substrate and the control circuit comprises a high temperature polysilicon thin film transistor control circuit.

22. The semiconductor pressure sensor of claim 12 wherein the control circuit is positioned on a printed circuit board (PCB) electrically connected to the insulating diaphragm and the piezoresistor via a flexible printed circuit (FPC) board.

23. The semiconductor pressure sensor of claim 12 wherein the control circuit is positioned on a flexible printed circuit (FPC) board, the control circuit being electrically connected to the insulating diaphragm and the piezoresistor via the flexible printed circuit board.

24. The semiconductor pressure sensor of claim 12 wherein the insulating substrate further comprises a thin film transistor display region for displaying a variation of pressure detected by the semiconductor pressure sensor.

* * * * *